United States Patent
Yang

(10) Patent No.: US 11,379,934 B1
(45) Date of Patent: Jul. 5, 2022

(54) INTERACTIVELY SOCIAL MEDIA STREAMING SYSTEM

(71) Applicant: Hui Ju Yang, Taipei (TW)

(72) Inventor: Hui Ju Yang, Taipei (TW)

(*) Notice: Subject to any disclaimer, the term of this patent is extended or adjusted under 35 U.S.C. 154(b) by 0 days.

(21) Appl. No.: 17/130,418

(22) Filed: Dec. 22, 2020

(51) Int. Cl.
| | |
|---|---|
| *G06F 16/16* | (2019.01) |
| *G06Q 50/00* | (2012.01) |
| *H04L 65/60* | (2022.01) |
| *H04L 51/52* | (2022.01) |
| *G06Q 40/04* | (2012.01) |
| *G06Q 20/40* | (2012.01) |
| *G07F 17/32* | (2006.01) |
| *G06Q 20/38* | (2012.01) |
| *H04L 9/40* | (2022.01) |
| *G06Q 50/34* | (2012.01) |

(52) U.S. Cl.
CPC ........... *G06Q 50/01* (2013.01); *G06F 16/162* (2019.01); *G06Q 20/384* (2020.05); *G06Q 20/405* (2013.01); *G06Q 40/04* (2013.01); *G06Q 50/34* (2013.01); *G07F 17/3237* (2013.01); *G07F 17/3288* (2013.01); *H04L 51/32* (2013.01); *H04L 63/04* (2013.01); *H04L 65/60* (2013.01)

(58) Field of Classification Search
USPC .................................................. 705/35–37
See application file for complete search history.

(56) References Cited

U.S. PATENT DOCUMENTS

| | | | |
|---|---|---|---|
| 8,583,470 B1* | 11/2013 | Fine ................. | G06Q 40/04 705/7.31 |
| 2004/0128157 A1* | 7/2004 | Aquilino ........... | G06Q 30/02 463/25 |
| 2013/0143646 A1* | 6/2013 | Angell ............... | G07F 17/3244 463/25 |
| 2018/0232760 A1 | 8/2018 | Allen et al. | |

FOREIGN PATENT DOCUMENTS

| | | | |
|---|---|---|---|
| CN | 110321730 A | * | 10/2019 |
| KR | 20180089330 A | | 8/2018 |
| KR | 102082670 B1 | | 2/2020 |
| KR | 20200029136 A | | 3/2020 |

OTHER PUBLICATIONS

International Search Report PCT/US2021/063750 dated Apr. 15, 2022 (pp. 1-14).

* cited by examiner

*Primary Examiner* — William E Rankins
(74) *Attorney, Agent, or Firm* — Millen, White, Zelano & Branigan, P.C.; William F. Nixon; Christin Montfort

(57) ABSTRACT

A social media streaming system, includes a server and at least one client device. The server includes a server-trading module. The client device includes a display component and an input component. The input component is configured to receive a trading request, and send the trading request to the server. When the server receiving the trading request, subsequently, the server-trading module generates a trading log based on the trading request. The client device is enabled to delete the trading request after the trading log is generated.

10 Claims, 5 Drawing Sheets

INTERACTIVELY SOCIAL MEDIA STREAMING SYSTEM

BACKGROUND

Field of Invention

The present disclosure relates to a social media streaming system for trading or betting more securely. More particularly, the present disclosure relates to a social media streaming system with secured mechanisms.

Description of Related Art

Nowadays, smart devices and social media platforms greatly penetrate our life, and impact on entertainment, shopping, communication, and so on. In the meanwhile, convenience of social media may also induce unsecured personal information transmission, furthermore, sensitive personal information may be leaked through smart devices. For instance, if we lost our personal smart device, or smart device is stolen, our sensitive personal information, confidential information, trading records, or other sensitive information might be leaked.

However, users may unaware the leakage of sensitive information through smart devices, furthermore, the risk of leaking sensitive information deposited in smart devices. Losses of theft or fraud, created by hacked smart devices, are greatly increased. Consequently, the available social media streaming platforms, as described above, apparently exist with inconvenience and defect, which needs further improvement. To deal with aforesaid problem, practitioners of ordinary skill in the art have striven to attain a solution, still lacks a suitable solution to be developed. Therefore, to deal with aforesaid problem effectively is an important subject of research and development, and also a desired improvement in the art.

SUMMARY

The present disclosure provides a streaming system, especially an information-secured streaming platform. The social media streaming system includes a server and a client device. The server includes a server-trading module. The client device includes a display component and an input component. The input component is configured to receive a trading request, and send the trading request to the server. When the server receiving the trading request, subsequently, the server-trading module generates a trading log based on the trading request. The client device is enabled to delete the trading request and the trading log, after the trading log is generated.

It is to be understood that both the foregoing general description and the following detailed description are by examples, and are intended to provide further explanation of the invention as claimed.

BRIEF DESCRIPTION OF THE DRAWINGS

The disclosure may be more fully understood by reading the following detailed description of the embodiment, with reference made to the accompanying drawings as follows.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

Figure 1:
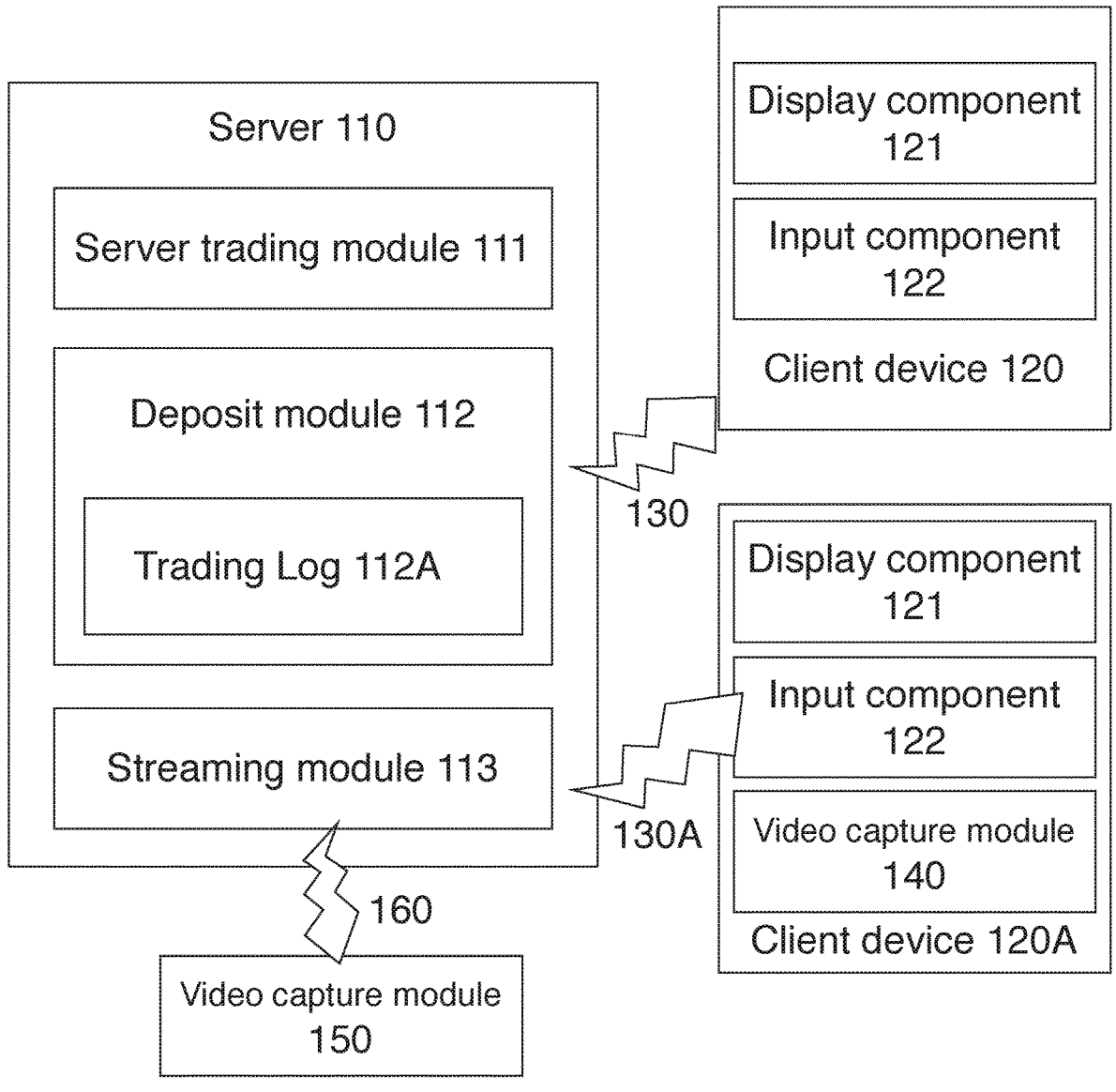
FIG. 1 is a schematic block diagram of a social media streaming system, according to an embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

FIG. 1 illustrates a schematic block diagram of a social media streaming system 100, described electrically connection and interaction among the components of the social media streaming system 100, according to an embodiment of the present disclosure. As shown in FIG. 1, social media streaming system 100 includes a server 110 and at least one client device 120. The server 110 includes a server-trading module 111 and a deposit module 112. The client device 120 includes a display component 121 and an input component 122. In some embodiments, the client device 120 is a smart device, such as smart phone, smart pad, or other suitable electronic device having display component and input component. In some embodiments, the input component 122 is a keyboard, a numbers keyboard, a touch panel displayed with at least one option, or other suitable electronic input component, to receive an input request. In some embodiments, the input component 122 is configured to generate a trading request 130, having input-trading information, based on the input request. In some embodiments, the input-trading information includes Identity information corresponding to the client device 120. In some embodiments, the input-trading information may include a betting data and a trading data. In some embodiments, the betting data may include a betting configuration, such as bets, stakes, auto-betting, winning condition, paying methods or other suitable setting for proceeding various gambling games. In some embodiments, the trading data may include a trading configuration, such as quantities of merchandise, prices, paying methods, Coupons, or other suitable setting for purchasing commodity.

Subsequently, the trading request 130 is transmitted to the server 110 through electrically-connected. In some embodiments, the client device 120 transmits the trading request 130 to the server 110 through local area networks (LANs), wide area networks (WANs), overlay networks, software-defined networks or other suitable network transmission method. After the server 110 receiving the trading request 130, subsequently, the server-trading-module 111 manages the trading request 130, and generates a server trading log 112A based on the trading request 130. In some embodiments, the server trading log 112A is generated after the trading request 130 being executed, and deposited in a deposit module 112. The client device 120 is enable to delete the trading request 130 and the server trading log 112A, after the server trading log 112A is generated.

Owing to the client device 120 is empowered to delete or erase all trading records, including, but not limited to the trading request 130 and the server trading log 112A, the trading records or other sensitive information are secured even if the client device 120 being stolen or lost. On the other hand, the trading log 112A is generated by the server-trading-module 111 after the trading request 130 being processed, which means that the deletion of the trading request 130 and the server trading log 112A may not influence the execution of trading or betting process. On the contrary, while users withdraw or delete messages or record from client end in other social media streaming platforms, the deleted messages or trading records are still deposited in server log to fulfill the advance needs, such as big data or commercial advertisement, in which the server log may lead to leakage of sensitive information. As a consequence, the social media streaming system 100, described herein, comparing to other social media streaming platforms, may greatly reduce the risk of leaking trading records or other sensitive information, substantially, the social media streaming system 100 provide more protection to personal sensitive information of users.

It should be noted that, in some embodiments, the client device 120 may include one or more input component 122, including but not limited to the present disclosure. The input component may include physical or virtual interfaces, such as an interface controlled by sensing gesture, eyeball movement or sound, a wireless controller electrically connected to the client devices 120, as well as, an image detector or other suitable communication interface, to generate and send trading request 130 to the server 110. It should be understood that, aspect of the input component 122, could be adjusted to actual demand by those skilled in the art, without departed from the scope or the spirits of the present disclosure. That is to say, prerequisite of the input component 122 is to receive user's trading or betting demand, and generated the trading request 130, and transmit a readable or applicable signal to the server-trading module 111 of the server 110.

In some embodiments, the server 110 may further include a streaming module 112. The streaming module 112 is configured to transmit a video data to the client device 120, to stream on the display components 121. In some embodiments, a video capture device 140 send a video signal to the server 110. Subsequently, the streaming module 112 generates a video data based on the video signal, and send the video data to one or more client device 120. In some embodiments, the video capture device 140 is a component of the client device 120A. In some embodiments, a video signal may be transmitted from a video capture device 150, such as camera, streaming media, or other suitable video source.

Figure 2:
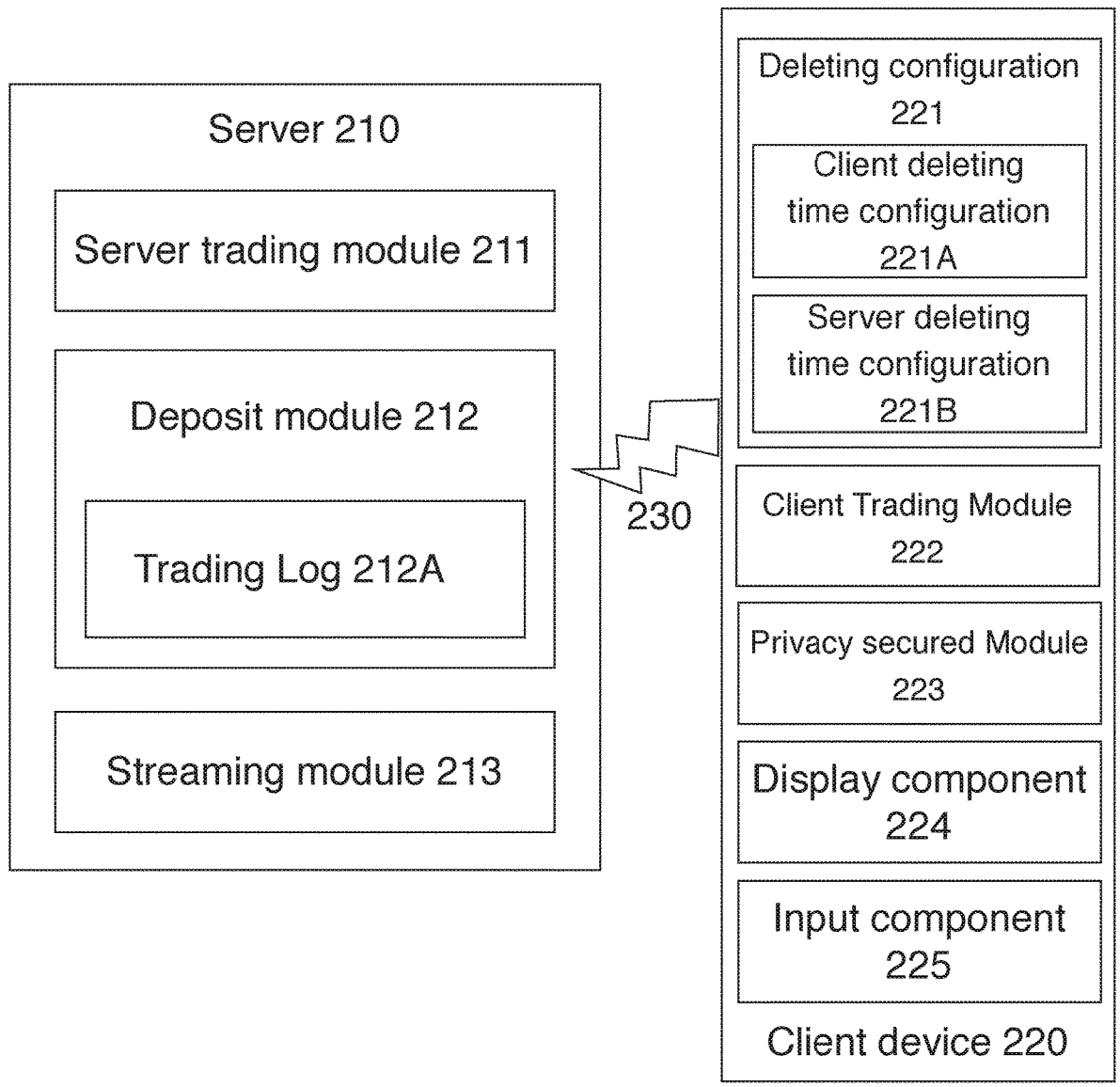
FIG. 2 is a schematic block diagram of a client devices according to another embodiment of the present disclosure.

FIG. 2 illustrates a schematic block diagram of a client devices 200, described electrically connection and interaction among the components of the client devices 200, according to another embodiment of the present disclosure. As shown in FIGS. 1 and 2, the client device 200 may further include a deleting configuration 210. In some embodiments, the deleting configuration 210 includes a client deleting time configuration 211 and a server deleting time configuration 212. The client device 200 is configured to automatically delete the trading request 230 according to the client-deleting-time configuration 211. In some embodiments, the server 210 is configured to delete or erase the trading log 212A from the deposit module 212 according to the server-deleting-time configuration 212.

In some embodiments, the client devices 220 may further include a one-click-secured configuration. While the one-click-secured configuration is activated, the deleting time configuration 211 and a server deleting time configuration 212 is set to immediately execution, all the trading request 230 and the trading log 212A would be deleted immediately.

In some embodiments, the client devices 220 further includes a privacy secured module 223. The privacy secured module 223 is configured to automatically generate an identification icon on the display component 224. In some embodiments, the identification icon may be combination of QRCODE, special ID, background generated by identical picture generated algorithm, such as Generative Adversarial Network (GAN), Deep convolution generative adversarial network (DCGAN), or other suitable generating algorithm. In some embodiments, the identification icon on two or more client devices are distinguishable. In some embodiments, the identification icon is generated while the client device 220 being screenshot.

Figure 3:
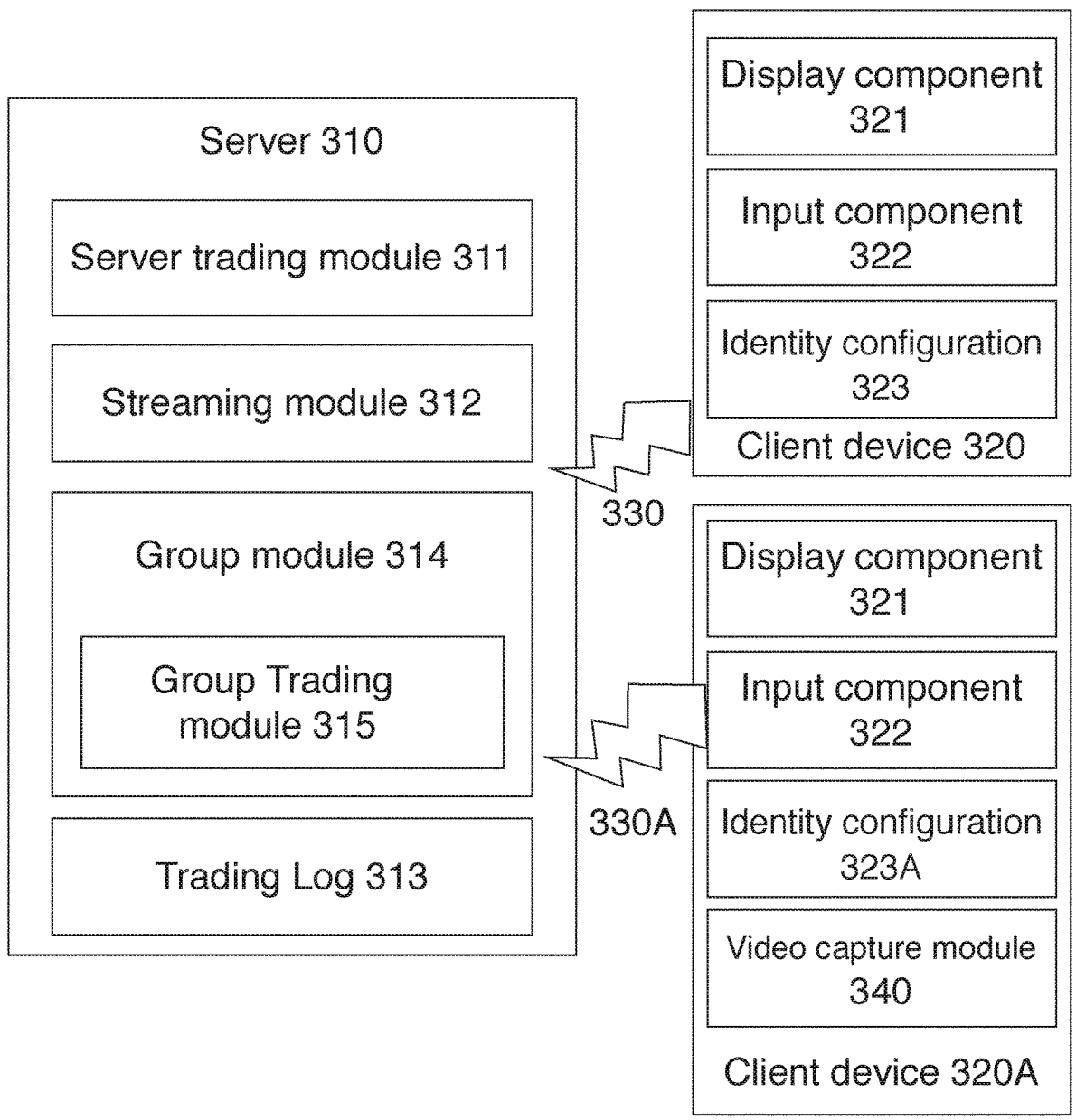
FIG. 3 to FIG. 5 are schematic block diagrams of various social media streaming system according to some embodiments of the present disclosure.

FIG. 3 illustrates a schematic block diagram of a social media streaming system 300, described electrically connection and interaction among the components of the social media streaming system 300, according to an embodiment of the present disclosure. In some embodiments, the server 310 further includes a group module 314. The group module 314 is configured to adjoin two or more client devices 320 in a group channel. The two or more client devices 320 directly communicate to each other through the group channel.

In some embodiments, each of the client devices 320 has an identity configuration 321. The group module 314 is configured to verify identity configuration 321 from different client devices 320, and generated corresponding identity tag showed in the group channel. In some embodiments, when the client device 320A is adjoined in two or more group channel, the client device 320A may modify different identity in the identity configuration 321, varied from different group channel. The group module 314 may verify the identity configuration 321, and shows the identity varied in different group channel based on the identity configuration 321. For example, when the client device 320 and the client device 320A adjoin in Group A channel and Group B channel. The client device 320 set the identity configuration 321 as Alice in Group A, and as Bloomberg in Group B, subsequently, the identity tag of client device 320 showed in the Group A channel would be Alice, and the identity tag of client device 320 showed in the Group B channel would be Bloomberg.

In some embodiments, the group module 314 may further include a group trading module 315. While the client device 320 transmitted a group trading request 330 to the group trading module 315, for example, creating a $1000 trading request in the Group A channel for the client device 320A or other client devices in the Group A channel. The group trading module 315 is configured to generate a trading option showed in the Group A channel. Therefore, the client device 320A is enable to executed the trading option by transmitted the group trading request 330A. In some embodiments, the group trading request 330, the group trading request 330A, and the trading log 313, are deleted by both the client device 320 and the client device 320A.

Figure 4:
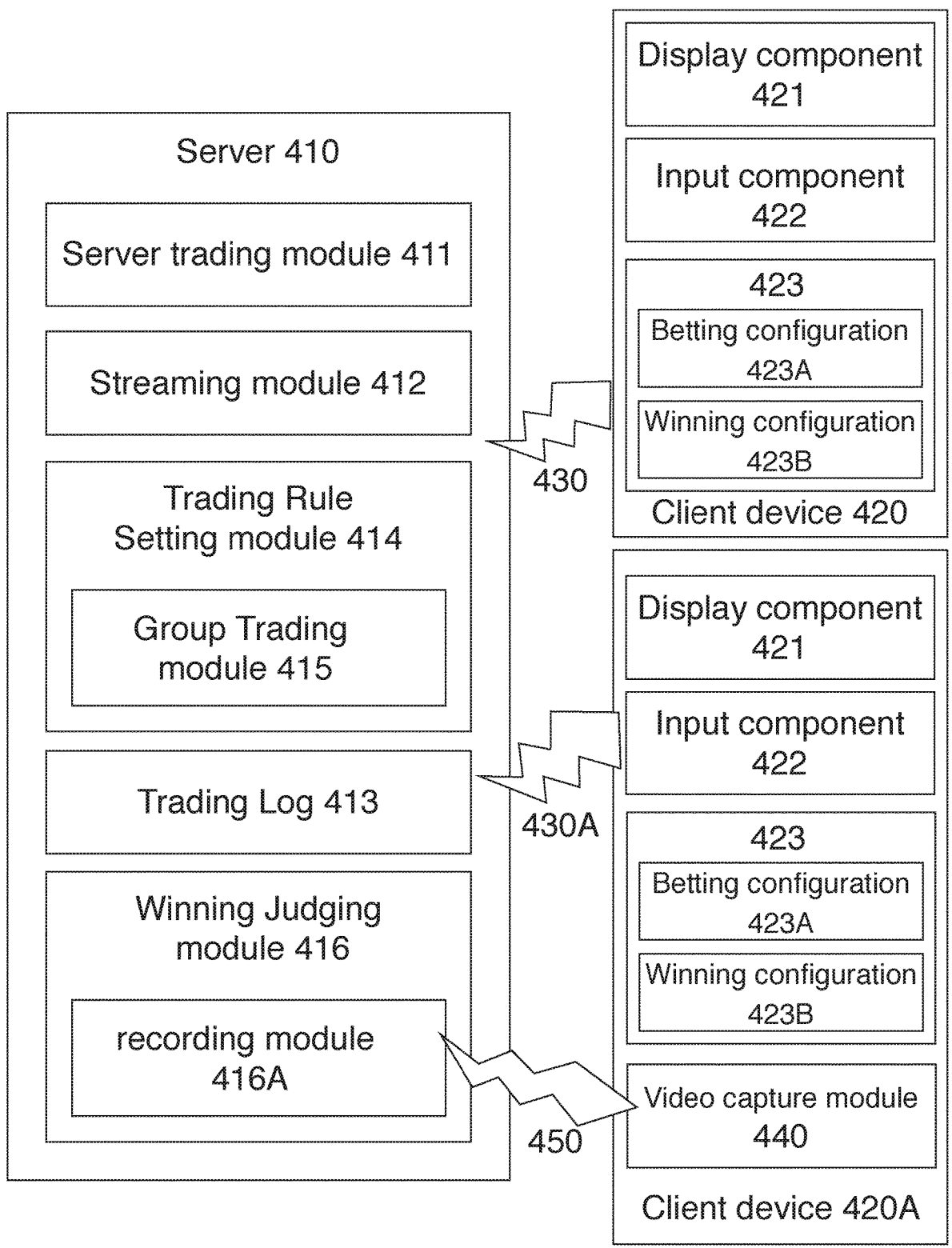

FIG. 4 illustrates a schematic block diagram of a social media streaming system 400, described electrically connection and interaction among the components of the social media streaming system 400, according to an embodiment of the present disclosure. In some embodiments, the server 410 may further include a trading rule setting module 414. The client devices 420 may further include a trading rule configuration 423. In some embodiments, the user modifies the trading rule configuration 423 through the input components 422. In some embodiments, the trading configuration 423 may include picture setting, quantities setting, prices setting, paying methods setting, coupons setting, or other suitable setting for purchasing or selling commodities.

In some embodiments, the trading rule configuration 423 may include a betting configuration 423A. In some embodiments, the user adjusts different betting mode through the betting configuration 423A, such as odds, betting limitations, bets, auto-betting, paying methods or other suitable betting related settings.

In some embodiments, the trading rule configuration 423 may include a winning condition configuration 423B. In some embodiments, the user sets up a winning condition for stake to lay dissipation through the winning condition configuration 423B. The winning condition may include but not limit to Money line, Cent line, each way, Accumulator, Double, Forecast, Treble, Trixie, Patent, Yankee, Super Yankee, Fivefold, Canadian, Heinz, Outright, Half time result, Double Result, Correct Score, Total over/under, Winning margin, Teasers, Point Spread, Handicap, First Goalscorer or other suitable winning condition setting.

In some embodiments, the server 410 may further include a winning judging module 416. The client device 420A may transmit a trading request 430A to the server 410. The trading request 430A may include a first winning result information, generated by the client device 420A. The winning judging module 416 may generate a first dissipating result to dissipate stake, betting, or lay. The first dissipating result is generated based on the first winning result information, the betting configuration 423A and the winning configuration 423B.

In some embodiment, the winning judging module 416 may further include a recording module 416A. The client device 420A may further includes a video capture module 440. The video capture module 440 is configured to recording the gambling video, or the game streaming, and generate a game recording data 450. Subsequently, the client device 420A transmits the game recording data 450 to the recording module 416A. If any of the client device challenge or doubt the first dissipating result, the winning judging module generates a second dissipating result according to the recording module 416A, the trading request 430A, the betting configuration 423A and the winning configuration 423B. The stake, betting, or lay may be re-dissipated according to the second dissipating result. In some embodiments, the client device 420A is enable to delete the trading request 430A, the first dissipating result, and the second dissipating result.

Figure 5:
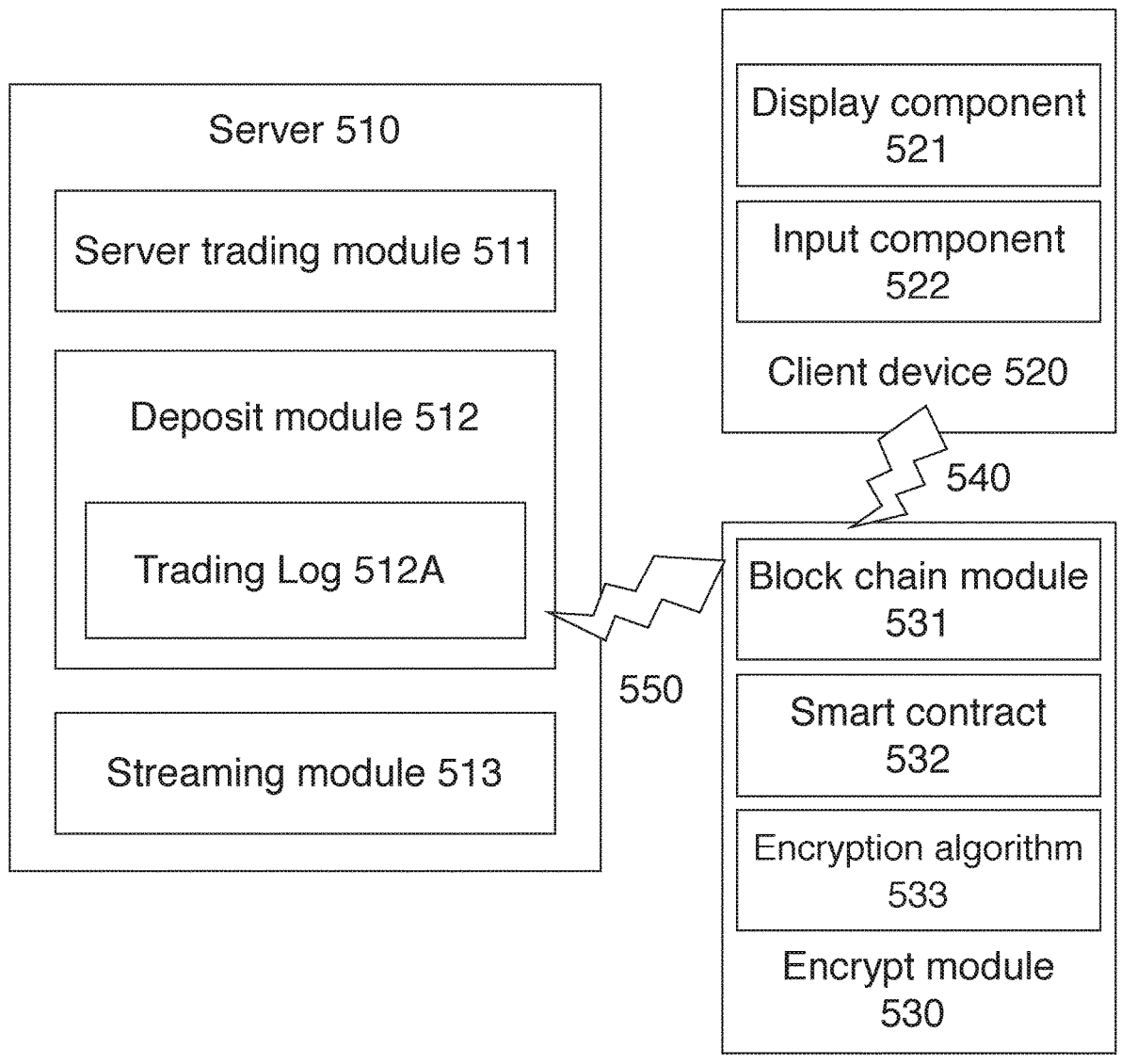

FIG. 5 illustrates a schematic block diagram of a social media streaming system 500, described electrically connection and interaction among the components of the social media streaming system 500, according to an embodiment of the present disclosure. In some embodiments, the social media streaming system 500 may further include an encrypt module 530. The trading request 540 is firstly transmitted to the encrypt module 530, to encrypted into trading request 540A, in which the IP address and encrypt key embedded in the trading request 540 is encrypted by the encrypt module 530. In some embodiments, the encrypt module 530 may include a blockchain module 531, a smart contract module 532, or Encrypt algorithm 533. Subsequently, the trading request 540A is transmitted to the server 510.

Although some embodiments of the present disclosure and their advantages have been described in detail, it should be understood that various changes, substitutions, and alterations may be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, fabricate, composition of matter, means, methods, and steps described in the specification. As one of ordinary skill in the art will readily appreciate from the disclosure of the present disclosure, processes, machines, fabricate, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, fabricate, compositions of matter, means, methods, or steps.

What is claimed is:

1. A social media streaming system, comprising:
a server, comprising a server-trading module; and,
at least one client device, comprising a display component, and an input component, wherein the input component is configured to receive a trading request, and send the trading request to the server,
wherein when the server receives the trading request the server-trading module generates a trading log based on the trading request,
wherein the client device is enabled to delete the trading request after the trading log is generated.

2. The social media streaming system of claim 1, wherein the server comprises a streaming module, streaming a video data to the display component.

3. The social media streaming system of claim 1, wherein the client device sets up a deleting configuration, comprising a client-deleting-time, wherein the client device is configured to automatically delete the trading request based on the client-deleting-time.

4. The social media streaming system of claim 3, wherein the deleting configuration further comprises a server-deleting-time, configured to delete the trading log from the server based on the server-deleting-time.

5. The social media streaming system of claim 1, wherein the client device further comprises a trading rule configuration, to set a trading or betting rule.

6. The social media streaming system of claim 1, wherein the client device further comprises a privacy secured module, configured to automatically generate an identification icon on the display component.

7. The social media streaming system of claim 6, wherein the identification icon on two or more client devices is distinguishable.

8. The social media streaming system of claim 1, wherein the server further comprises a group module, configured to adjoin two or more client devices in at least one group channel, wherein the two or more client devices directly communicate in the group channel.

9. The social media streaming system of claim 8, wherein each of the client devices has an identity configuration, configured to show an identity in the group channel, wherein when the client device is in two or more group channels, the client device shows the identity based on the identity configuration, wherein the identity configuration is varied in different group channels.

10. The social media streaming system of claim 1, wherein the server further comprising a winning judging module and a recording module, the winning judging module is configured to generate a first dissipating result based on the trading request, wherein when the client device challenges the first dissipating result, the winning judging module is enabled to generate a second dissipating result based on the recording module and the trading request.

* * * * *